United States Patent [19]

Bellis

[11] 3,919,596

[45] Nov. 11, 1975

[54] TOUCH SENSITIVE POWER CONTROL SYSTEM

[76] Inventor: Robert Elliott Bellis, 700 7th St., Boulder City, Nev. 89005

[22] Filed: Jan. 31, 1973

[21] Appl. No.: 328,371

[52] U.S. Cl. ................ 315/294; 307/293; 307/305; 307/308; 315/315; 315/320; 315/323; 340/258 C

[51] Int. Cl.[2] ...................... H05B 37/02; H05B 39/02; G01D 21/04

[58] Field of Search ............................ 315/320–323, 315/295, 297, 313–315, 294; 307/308, 294, 293, 305; 340/258 C

[56] References Cited

UNITED STATES PATENTS

| | | | |
|---|---|---|---|
| 2,896,131 | 7/1959 | Schumann | 340/258 C X |
| 2,955,201 | 10/1960 | Miller | 315/323 X |
| 3,392,352 | 7/1968 | White | 307/293 X |
| 3,524,997 | 8/1970 | Harnden et al. | 307/308 X |
| 3,530,310 | 9/1970 | Adelson et al. | 307/305 |
| 3,597,637 | 8/1971 | Vandemore | 307/305 X |
| 3,666,988 | 5/1972 | Bellis | 315/208 |
| 3,703,648 | 11/1972 | Wrabel | 307/293 |
| 3,764,819 | 10/1973 | Muller | 340/258 C X |

*Primary Examiner*—Alfred L. Brody
*Attorney, Agent, or Firm*—William J. Bethurum

[57] ABSTRACT

Disclosed is a capacitance responsive and touch sensitive power control system for successively switching different loads across a power supply. The system includes a pair of bidirectional triggerable switches, such as semiconductor TRIACS, which operatively connect and disconnect different loads in series with a single power supply. These switches are alternately driven to conduction and nonconduction in a predetermined sequence by a pair of bistable flip-flops, the inputs of which are controlled by body capacitance signals applied to a common input circuit of the system. A novel threshold and delay noise discrimination network is interconnected between this input circuit of the system and the pair of bistable flip-flops and it discriminates between body capacitance signals and line noise in order to minimize false operation of the system due to line noise. In a preferred embodiment of the invention, the triggerable switches are a pair of TRIACS which respond to a predetermined sequence of conductive states of the pair of flip-flops, respectively, to provide successively higher power levels to multiple loads in response to successive body capacitance signals received at the touch signal input circuit.

10 Claims, 2 Drawing Figures

TOUCH SENSITIVE POWER CONTROL SYSTEM

FIELD OF THE INVENTION

Figure 1:
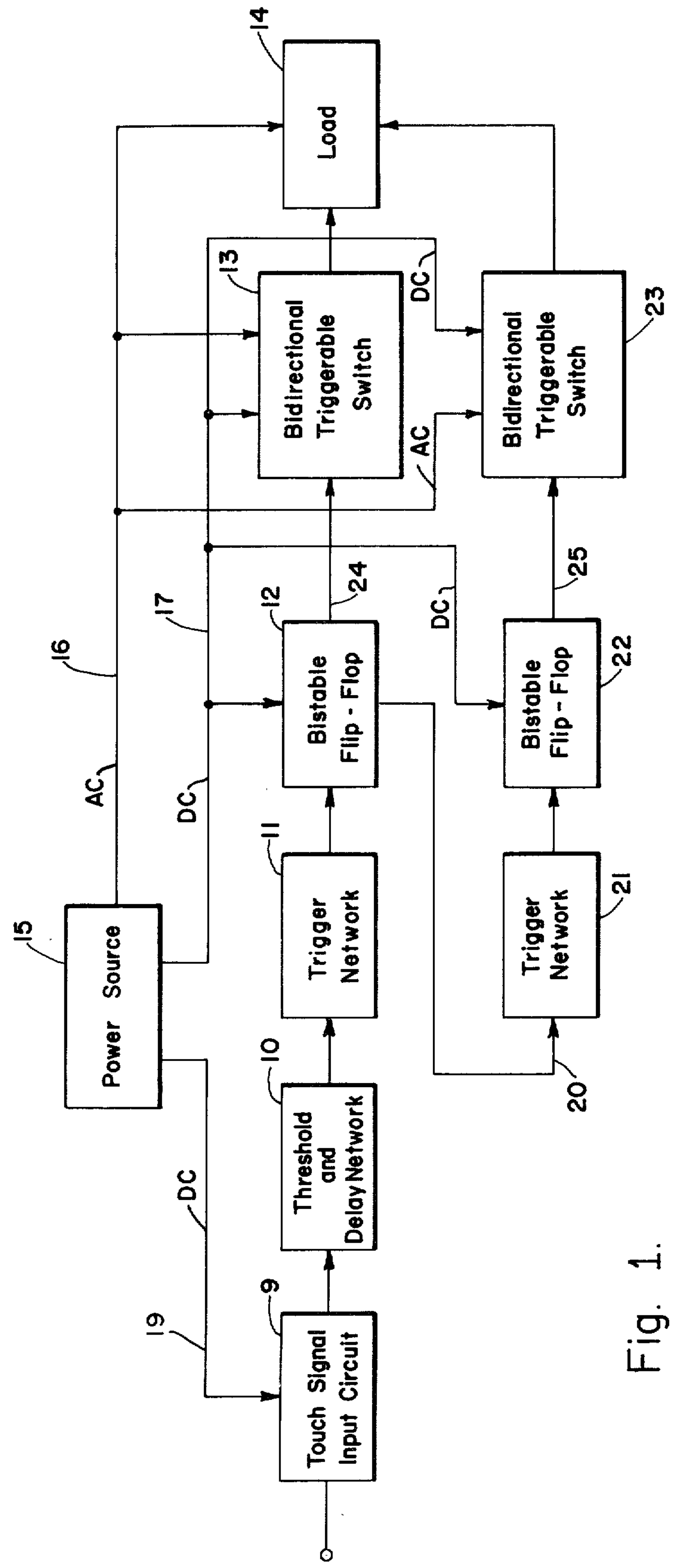

This invention relates generally to touch sensitive power control systems and more particularly to novel improvements in such systems which render same highly insensitive to noise and which operate to connect multiple loads to a power supply.

BACKGROUND

Touch sensitive, body capacitance responsive electronic circuits and systems for switching power to a load are well known in the art. Very recent and state-of-the-art circuitry in this field of invention is disclosed and claimed in my U.S. Pat. No. 3,666,988. Presently, there is a great commercial interest in touch sensitive electronic circuitry and systems, both from the standpoint of their novelty appeal to the layman and also from the standpoint of the significant utility that such circuits and systems have over force operated switches. Thus, using my above patented invention, a paraplegic can turn on and off a bedside lamp merely by touching a metal base of the lamp and without the requirement for exercising either force or control over a small on-off switch. Additionally, my above-identified patented invention may be used to control the power to various types of lamps or to other appliances, such as variable speed blenders, without the necessity for force operating a small switch. This feature has particular utility in the touch control operation of lamps or other appliances in either total or partial darkness.

THE INVENTION

The general purpose of this invention is to provide further novel improvements in touch responsive electronic circuitry and systems in addition to those disclosed and claimed in my above U.S. Pat. No. 3,666,988. These improvements serve, respectively, to prevent the falsing (false operation) of such systems in response to extraneous line noise and static electricity and to enable the successive electrical connection of multiple loads to a power supply. To attain the first of these additional improvements, I have provided novel noise discrimination circuitry which is connected in the signal path of the system at the output of a touch signal input circuit. This circuitry discriminates between body capacitance input signals and noise signals, both of which are received at the input circuit. To attain the second of these above novel improvements, I have provided a pair of bistable flip-flop circuits in the system, a first of which is driven by the output signals from the noise discrimination circuitry to control the conductivity of a first triggerable switch at a first switching rate. The second flip-flop circuit is driven by the first flip-flop circuit to control the conductivity of a second triggerable switch at a second switching rate. These switches first alternately and then simultaneously connect separate loads to a power supply in a predetermined timed sequence, thereby imparting a multiple load driving capability to the circuit.

Accordingly, it is an object of the present invention to provide new and improved body capacitance responsive circuitry which is highly insensitive to line noise and static discharge encountered in heavily carpeted environments.

Another object of this invention is to provide body capacitance responsive switching circuitry of the type described which provides multiple output switching functions in response to successive touch signals at a common electrical input of the circuit, thereby imparting substantial switching flexibility to the circuit.

A further object is to provide switching circuitry of the type described which features multiple load driving capability.

A novel feature of the invention is the provision of sequential switching of multiple loads across a power supply in response to cascaded flip-flop or shift register type operation. This feature imparts a predictable "truth table" response capability for multiple output switches of the circuit, as will be further described.

DRAWINGS

Figure 2:
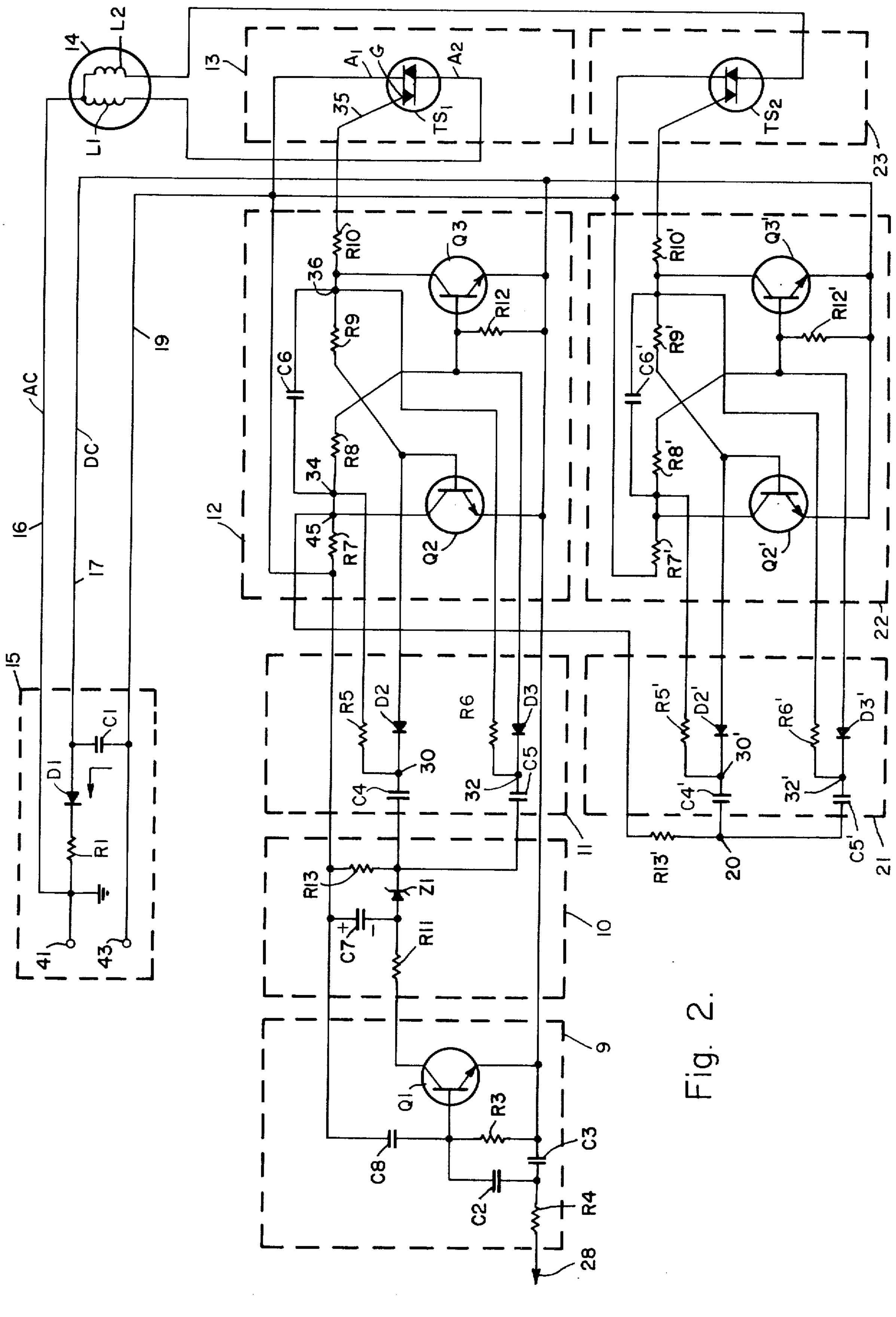

FIG. 1 is a functional block diagram of the touch sensitive control system according to the present invention; and FIG. 2 is a schematic circuit diagram of the control system in FIG. 1.

Referring now to FIG. 1, there is shown a touch signal input circuit 9 which is DC coupled to a noise discrimination threshold and delay network 10. The network 10 is DC coupled to the input of a trigger network 11 whose outputs are AC coupled to the inputs of a first bistable flip-flop 12. The first bistable flip-flop 12 is DC coupled to drive a first bidirectional triggerable switch 13, whose output terminals are connected in series with one of the output loads, the multiple loads being designated generally 14.

A power source 15 has an AC voltage output connection 16 connected to the output loads 14, and it further includes a pair of DC output voltage connections 17 and 19 which supply a DC voltage to the various stages 9, 12 and 13 of the above described cascaded portion of the control system.

The first bistable flip-flop 12 has an output terminal connected via line 20 to the input of a second trigger network 21, and the latter network is identical to the first named trigger network 11. The output signals of the second trigger network 21 are AC coupled to the input of a second bistable flip-flop 22 whose output is in turn connected as shown to a second bidirectional triggerable switch 23. The second bidirectional triggerable switch 23 is connected to drive a different one of the multiple output loads 14, and the DC voltage on line 17 is connected as shown to provide an operating bias for both the second bistable flip-flop 22 and the second bidirectional triggerable switch 23. In a preferred embodiment of the invention, and as will be further described below with reference to FIG. 2, these first and second bidirectional triggerable switches 13 and 23 are semiconductor TRIACS which are well known bidirectional semiconductor power devices which can be switched on and off across an AC line.

The system of FIG. 1 is responsive to input body capacitance signals which are applied to the touch signal input circuit 9 to alternately drive the first bistable flip-flop 12 between its two stable conductive states on alternate input touch signals. The output signals on line 20 from the first bistable flip-flop 12 are operative to drive the second bistable flip-flop 22 between its two stable conductive states at one-half of the frequency of the first bistable flip-flop 12. Thus, as will be more fully understood in the following detailed description of FIG. 2, the output signal level at the output line 24 of the first flip-flop 12 is driven between two discrete levels of logic on successive body capacitance input pulses, whereas the output signal level on line 25 at the output of the second flip-flop 22 is driven between two discrete levels of logic on every other body capacitance input pulse applied to the input circuit 9. Similarly, the first bidirectional triggerable switch 13 is turned on and off by successive gate pulses applied thereto on each body capacitance input signal applied to the touch signal input circuit 9. And the second bidirectional triggerable switch 23 is turned on and off by every other body capacitance signal applied to the input circuit 9. This novel feature of the present invention makes it possible for the switch 13 to first connect the load L1 (see FIG. 2) across the AC line, then connect L2 across the AC line while disconnecting L1, and then connect both L1 and L2 across the AC line simultaneously. In this manner, three successively increasing power levels can be achieved using only two distinct loads L1 and L2.

Finally, the first and second bistable flip-flops 12 and 22 are cascaded in such a manner that on every fourth input pulse applied to system, the output signals on lines 24 and 25, respectively, turn off both the first and second output switches 13 and 23 to disconnect both loads from the AC supply in preparation for another cycle of operation as will be described below. The system of FIG. 1 has particular utility in the selective energization of the well known three-way lamp bulb which contains two separate filament loads, each of which are either on at different times or the same time in order to provide 3 levels of light output.

In order to more fully understand and appreciate the novel features of the present invention, reference is made to FIG. 2 wherein the operation of the cascaded stages 9, 10, 11, 12, 13 and 14 will be initially described. This description will enable the reader to understand the basic touch control operation of the invention. Thereafter, the operation of the additional and parallel signal path of the system, including stages 21, 22 and 23 will be described, with particular emphasis on the control exerted on these latter stages by the first bistable flip-flop 12. Referring now in detail to FIG. 2, the touch signal input circuit 9 includes a high gain input transistor Q1 having its emitter connected to the negative side 17 of the DC power supply 15 and its base connected through an input coupling capacitor C2 and an input current limiting resistor R4 to an equipotential touch control surface designated 28. The resistor R4 provides a very high resistance isolation (5–10 megohms) between the touch control surface 28 and the input stage 9 and thereby prevents any detectible current flow or shock by the person touching the control surface 28, even though that person is solidly grounded. A base bias resistor R3 is connected as shown between the base of transistor Q1 and the negative side 17 of the DC power supply, and further a capacitor C3 is coupled between one plate of the capacitor C2 and the resistor R3 and optimizes the circuit sensitivity by balancing the residual conduction of transistor Q1 due to 60 cycle hum noise. The value of capacitor C3 is somewhat dependent upon the size and the electrical environment of the touch control surface 28, and the reference numeral 28 is intended to represent any touch control surface to which a portion of the human body, such as a person's finger, may capacitively connect this surface to ground potential or to some other point of reference potential.

The capacitor C8 is connected as shown to the base of the NPN transistor Q1 and to one side 19 of the DC supply and is utilized for the purpose of aiding in minimizing false operation due to line noise.

The touch signal input circuit 9 is connected via the collector of the NPN transistor Q1 to a series resistor R11 in the threshold and delay noise discrimination network 10. This discrimination network 10 also includes a capacitor C7, a threshold series Zener diode Z1, and a resistor R13 connected in the series parallel arrangement shown. The purpose and function of this network 10, as well as the functions of the other stages of the present control system, will be described further down in the specification in the detailed description of the system operation.

The noise discrimination network 10 is DC coupled to a first trigger network 11 which includes a pair of capacitors C4 and C5 serially connected, respectively, through a pair of steering diodes D2 and D3 into the first bistable flip-flop stage 12. The junctions 30 and 32 intermediate the last named capacitor and diode series combinations are connected through a pair of resistors R5 and R6, respectively, to the collector nodes 34 and 36 of the first bistable flip-flop 12.

The first bistable flip-flop 12 includes a pair of cross-coupled, alternately conducting NPN transistors Q2 and Q3 connected base-to-collector as shown through resistors R8 and R9, and further a capacitor C6 is connected between these two last named resistors in order to stabilize the bistable switching of the first bistable flip-flop 12. Additionally, a pull-down resistor R12 is connected as shown between the base and emitter of transistor Q3, and this resistor biases Q3 to nonconduction so that transistor Q2 always assumes an "on" state in the absence of a triggering signal applied to the touch control surface 28. This bias of Q2 does not appreciably affect normal flip-flop operation and assures that the switch 13 is not triggered to conduction when the circuit is initially energized by plugging into an AC supply or when the circuit is deenergized after an AC power interruption. However, in the condition when the circuit has been energized but no input signal has been received at input node 28, Q1 and Q3 are normally nonconducting and Q2 is normally conducting. Similarly Q3 is normally nonconducting, whereas Q2 is normally conducting.

The first bistable flip-flop stage 12 is coupled via a series resistor R10 and line 35 into the gate electrode G of the first bistable triggerable switch $TS_1$, which in a preferred embodiment of the invention is a semiconductor TRIAC. The switch $TS_1$ has one of its output terminals A1 connected to the common voltage supply line 19 and has its other output terminal A2 connected to a first output load L1, which in the present preferred embodiment in FIG. 2 is a 50 watt filament of a three-way lamp bulb 14.

The power source 15 includes a pair of input terminals 41 and 43 for connection to a standard 117 volt AC home outlet, and the input terminal 41 is grounded as shown. The rectifier and filter network consisting of resistor R1, diode D1, capacitor C1 provide a rectified DC ripple voltage between lines 17 and 19 which is connected as shown to provide DC power to the various stages of the systems. At the same time, a 60 cycle 117 volt AC power supply is available between lines 16 and 19, and the loads L1 and L2 and the two TRIACS $TS_1$ and $TS_2$ are serially connected as shown across this AC supply. Thus, separate AC and DC voltage sources, are not required with the present invention, and the DC ripple voltage between lines 17 and 19 is adequate for providing DC power to various stages in the circuit.

The first bistable flip-flop 12 is connected at node 45 and via resistor R13 to the input junction 20 of a second trigger network 21. This network 21 is identical to the trigger network 11 previously described. Additionally, a second bistable flip-flop 22 is driven by the output signals from the second trigger network 21 and is identical both in schematic connection and in component values to the first bistable flip-flop 12. The numerical designation of the electrical components in these two cascaded stages 21 and 22 is the same as those for stages 11 and 12 above, the prime notation being added to the former to avoid a duplication in numbering.

The output of the second bistable flip-flop stage 22 is connected via series gate current limiting resistor R10 to the gate electrode of a second bidirectional triggerable switch $TS_2$, and this switch $TS_2$ is connected as shown in series with a second output load L2. In the present exemplary embodiment of the invention, this load L2 is the 100 watt filament of the three-way lamp bulb load 14. The operation of the two output triggerable switches (TRIACS) $TS_1$ and $TS_2$ to control the three-way lamp 14 and the truth table for such operation is given below. Initally, the operation of the signal translation through stages 9, 10, 11, 12 and 13 will be described and this description will be followed by a description of the signal translation through the parallel signal path including stages 20, 21, 22 and 23.

OPERATION

When a person touches the touch control surface 28, this action causes the base circuit of transistor Q1 to provide the charging current for charging a person's body capacitance. The latter provides a fluxuation in the base current of Q1 which in turn provides an output trigger pulse at the collector of Q1. Now, with resistor R12 holding transistor Q3 off and with transistor Q2 biased to conduction, the negative going spike at the output of Q1 is coupled through the noise discrimination network and through the capacitor C4 and diode D2 therein and to the base of Q2. This pulse turns off Q2 and, by the well-known cross coupling of bistable flip-flop action, turns on transistor Q3 by the positive going signal at the collector of Q2. When transistor Q3 conducts, it provides the necessary turn-on gate current for the TRIAC $TS_1$ to switch this TRIAC to conduction and thereby connect the 50 watt filament L1 of the output lamp 14 in series with the AC power supply lines 16 and 19.

During the above switching action, the RC time delay network consisting of resistor R11 and capacitor C7 provides a necessary time delay during which the capacitor C7 is charged with the polarity indicated as shown. This time delay discriminates against short duration transients which may be coupled from the power lines into the circuit and inhibits these transients from reaching the trigger circuit 11. Furthermore, a Zener diode Z1 provides a threshold voltage level in the signal path of the network 10 which must be exceeded by the voltage across C7 before Z1 conducts and the signal can be capacitively coupled into the first trigger network 11. In this manner, only the 60 cycle capacitance to ground produced by bodily contact at input control surface 28 will cause the voltage across the Zener diode Z1 to exceed the threshold leel of this diode and couple through the first trigger network 11 to turn on the flip-flop stage 12.

During the above switching action thus far described, transistors Q2 and Q3 in the second bistable flip-flop are not affected as a result of the fact that Q2 has not yet been turned on to produce a negative going pulse at its collector. However, when a second touch or body capacitance signal is received at the touch control input surface 28, this signal is coupled through capacitor C5 and the diode C3, turning off the NPN transistor Q3 and, by flip-flop action, turning on transistor Q2. This switching action turns off the first bidirectional triggerable switch $TS_1$, and as transistor Q2 is turned back on, the negative going pulse at the collector of Q2 is coupled via resistor 13 and through the capacitor C4 and the diode D2 in the second trigger network 21 to turn off the previously conducting transistor Q2. By flip-flop action, this switching turns on transistor Q3 to thereby switch the second bidirectional triggerable switch $TS_2$ into conduction and connect the 100 watt filament load L2 of the lamp 14 in series with the AC power supply. Thus, the second touch of the input touch control surface 28 removes the 50 watt filament load L1 from the AC power supply while simultaneously connecting the 100 watt filament load across same, providing a second level of brightness output at the three-way lamp 14.

When a third successive body capacitance signal is received at the input touch control surface 28, the transistor Q2 is again turned off and the transistor Q3 is again turned on to retrigger the first bidirectional triggerable switch $TS_1$ to conduction and again connect the 50 watt load L1 of the lamp 14 in series across the AC power supply. However, when transistor Q2 is turned off, the positive going pulse at the collector of transistor Q2 is blocked by the diodes D2 and D3 and prevented by these diodes from altering the state of the second bistable flip-flop 22. Therefore, it is only when transistor Q2 is turned on that the second bistable flip-flop 22 is switched from one to another of its two conductive states. Thus, the state of the latter flip-flop remains unchanged by the third successive input pulse to the system, and the flip-flop 22 switches between its two conductive states at one half the frequency or repetition rate of that of the first bistable flip-flop 12.

When a fourth body capacitance input signal is received at the input terminal 28, transistor Q2 is again turned on as Q3 turns off, and this switching action again disconnects the first bidirectional triggerable switch $TS_1$ and its 50 watt filament load L1 from the AC power line 16. At the same time, the negative going pulse at the collector output of transistor Q2 is coupled through resistor R13, capacitor C5 and diode D3 to turn off the NPN transistor Q3 in the second bistable flip-flop 22. The latter switching action thus turns off the second bidirectional triggerable switch $TS_2$ and disconnects the 100 watt filament load L2 from the AC power line 49. Therefore, the fourth successive touch signal received at the touch control surface 28 totally disconnects both the 50 and 100 watt filament loads L1 and L2 from the AC power line 16, and the above cycle of operation is ready for another switching sequence identical to that described above. The following truth table will aid in the understanding of the operation of the present control system, and it represents the unique digital response of the present invention for controlling a conventional three-way lamp bulb.

TRUTH TABLE

| SIGNAL | TRIAC $TS_1$ | TRIAC $TS_2$ |
|---|---|---|
| | OFF | OFF |
| 1st touch | ON | OFF |
| 2nd touch | OFF | ON |
| 3rd touch | ON | ON |
| 4th touch | OFF | OFF |

It should be understood and it will be appreciated by those skilled in the art that the present control system is not limited to the switching of incandescent lamps, and it may be used to control power to various appliances by sequentially switching multiple loads in series with an AC power supply. Thus, the present invention may be utilized in the fabrication of a touch control automatic blender wherein successive touches can be utilized to switch increasing loads into a motor circuit to sequentially increase the speed thereof.

It will also be understood and appreciated by those skilled in the art that the present invention is not limited to switching successively increasing loads across an AC power supply, and it may instead be utilized to switch either decreasing loads in series with the power supply or alternately increasing and decreasing loads across a power supply for whatever reasons these load variations may be required to control a given electrical appliance.

What is claimed is:

1. A capacitance responsive power control system including, in combination:

a. a bidirectional triggerable switch having current input and output electrodes connectable to a load terminal, and a gate electrode for receiving control signals which control the conductivity of said switch, b. a bistable flip-flop connected to said triggerable switch for controlling the on-off gate-current to said switch, c. a trigger network connected to the input of said bistable flip-flop for coupling control signals thereto to switch the flip-flop between its two stable conductive states, d. a touch signal input circuit coupled to a single electrical input touch control surface and responsive to body capacitance signals applied thereto for providing a variable output signal, and e. noise discrimination circuit means intercoupling the output of said touch signal input circuit to the input of said trigger network for providing a threshold voltage which must be exceeded by the output signal level from said touch signal input circuit, said noise discrimination circuit means further providing a predetermined time delay which discriminates against signal durations less than said time delay to thereby prevent the latter from overcoming said threshold level and altering the conductive state of said flip-flop.

2. A capacitance responsive power control system including, in combination:

a. first and second separate loads, each connected to a single power supply terminal; said first load being connected to a first bidirectional triggerable switch and conducting current when said first bidirectional triggerable switch is gated to conduction, and said second load being connected to a second bidirectional triggerable switch and conducting current when said second bi-directional triggerable switch is gated to conduction;

b. a first bistable flip-flop connected to said first triggerable switch for controlling the on-off gate current thereto, c. a second bistable flip-flop coupled to an output terminal of said first bistable flip-flop and driven between two stable states at a fraction of the repetition rate of said first bistable flip-flop, said second bistable flip-flop being further connected to said second triggerable switch for controlling the on-off gate current thereto, d. a trigger network connected to the input of said first bistable flip-flop for coupling control signals thereto to switch said first and second bistable flip-flops between their two stable conductive states, e. a touch signal input circuit coupled to a single electrical input touch control surface and responsive to body capacitance signals applied thereto for providing a variable output signal, and f. noise discrimination circuit means innercoupling the output of said touch signal input circuit to the input of said trigger network for providing a threshold voltage which must be exceeded by the output signal level from said touch signal input circuit, said noise discrimination circuit means further providing a predetermined time delay which discriminates against single durations less than said time delay to thereby prevent the latter from overcoming said threshold level and altering the conductive state of said flip-flop, whereby said first and second loads conduct current in accordance with particular conductive states of said bistable flip-flops, and said flip-flops are operative to switch current through either of the two loads separately or through both of the two loads simultaneously and thereby provide three levels of output load current and power for said system in response to three successive body capacitance signals applied to said touch signal input circuit.

3. The invention defined in claim 2 wherein said first and second bidirectional triggerable switches are semiconductor TRIACS, each serially connected with one of said loads, and each having a gate electrode thereof directly coupled to said respective bistable flip-flops.

4. A body capacitance responsive control system for selectively connecting multiple loads to a power supply including, in combination:

a. a first bidirectional triggerable switch having current input and output electrodes serially connectable to a first load, and a gate electrode for receiving a trigger signal, b. a second bidirectional triggerable switch having current input and output electrodes serially connectable to a second output load and having a gate electrode for receiving a trigger signal, c. a first bistable flip-flop connected to the gate electrode of said first bidirectional triggerable switch for turning same on and off at the switching rate of said first bistable flip-flop, d. a second bistable flip-flop coupled between an output node of said first bistable flip-flop and the gate electrode of said second triggerable switch for turning the latter on and off at a fraction of the switching rate of said first bistable flip-flop, and e. capacitance responsive circuit means coupled between said first bistable flip-flop and a common touch signal input connection for switching said first bistable flip-flop from one to the other of its two conductive states and thereby turn said first bidirectional triggerable switch on and off at the switching rate of said first bistable flip-flop, whereby said first bidirectional triggerable switch is operative to connect said first output load across said power supply at selected time intervals and said second bidirectional triggerable switch is operative to connect said second output load across said power supply at other selected time intervals.

5. The invention defined in claim 4 wherein said capacitance responsive input circuit means includes noise discrimination means coupled between said touch signal input connection and said first bistable flip-flop and providing a threshold voltage level which must be exceeded by an amplified input signal in order to trigger said first flip-flop, said noise discrimination means further providing a predetermined signal time delay which discriminates against transient durations less than 60 cycle body capacitance signals applied to said input connection.

6. The invention defined in claim 5 wherein said noise discrimination means includes:

a. a reference voltage diode coupled between said input connection and said first bistable flip-flop for providing said threshold level which must be exceeded by signals passing therethrough, and b. a resistance capacitance time delay network connected at the input of said reference voltage diode for preventing the threshold level across said reference voltage diode from being reached for transient frequencies less than the 60 cycle body capacitance input signal applied to said input connection.

7. The invention defined in claim 6 wherein said capacitance responsive circuit means further includes:

a. an input amplifier for providing an initial high gain amplification of body capacitance signals applied to said input connection, b. said noise discrimination means coupled to the output of said input amplifier, and c. a first trigger network AC coupled between the output of said noise discrimination means and the input of said first bistable flip-flop for AC coupling the output pulses from said noise discrimination means into the respective control electrodes of a pair of cross-coupled transistors in said first bistable flip-flop, whereby said first and second transistors are switched to stable states of alternate conduction upon the successive application of body capacitance signals at said input connection.

8. The invention defined in claim 7 which further includes a second trigger network AC coupled between said output node of one of said transistors in said first bistable flip-flop and a pair of control electrodes of a pair of cross-coupled transistors respectively in said second bistable flip-flop, said second trigger network coupling control pulses to latter transistors each time said one transistor in said first bistable flip-flop is biased to conduction, whereby said second flip-flop is driven at one half the switching rate of said first flip-flop, thereby causing said second triggerable switch to connect said second load across said power supply at said latter switching rate and only after said first triggerable switch has connected said first load across said power supply.

9. The invention defined in claim 8 wherein:

a. said first and second loads are separate filaments in a three-way lamp bulb and are connected between said first and second triggerable switches and said AC power supply, and b. said switches are semiconductor sensitive gate TRIACS which operate on a very low gate current, thereby minimizing the power and heat dissipation in said system.

10. A capacitance responsive power control system including, in combination:

a. a bidirectional triggerable switch having current input and output electrodes connectable to a load terminal, and a gate electrode for receiving control signals which control the conductivity of said switch, b. a bistable flip-flop connected to said triggerable switch for controlling the on-off gate current to said switch, c. a trigger network connected to the input of said bistable flip-flop for coupling control signals thereto to switch the flip-flop between its two stable conductive states, d. a touch signal input circuit coupled to a single electrical input touch control surface and responsive to body capacitance signals applied thereto for providing a variable output signal, and e. noise discrimination circuit means coupling the output of said touch signal input circuit to the input of said trigger network, said noise discrimination circuit means including:

i. a series resistor and a Zener diode serially connected between the output of said touch signal input circuit and said trigger network for providing a signal path to the input of said trigger network, ii. a load resistor connected between the common node of said Zener diode and said trigger network and the power supply terminal, and iii. a capacitor connected between a common node of said series resistor and said Zener diode and said power supply terminal, whereby the capacitor begins to charge up to a predetermined threshold level after said input touch control surface receives a body capacitance signal, and said Zener diode is biased to reverse conduction to conduct current to said input circuit after said capacitor has charged to a predetermined level, whereby a time delay is introduced into signals coupled from said touch signal input circuit to said trigger network; said time delay discriminating against signal durations less than said time delay to thereby prevent the latter signals from overcoming said threshold level and altering the conductive state of said flip-flop.

* * * * *